United States Patent [19]

Falke et al.

[11] Patent Number: 5,068,217

[45] Date of Patent: Nov. 26, 1991

[54] CARRIER CATALYSTS FOR OXIDIZING CARBON MONOXIDE AND PROCESS FOR THEIR PRODUCTION

[75] Inventors: Holger Falke, Hemmingen; Guenther Strauss, Hanover, both of Fed. Rep. of Germany

[73] Assignee: Gutec, Hanover, Fed. Rep. of Germany

[21] Appl. No.: 506,345

[22] Filed: Apr. 9, 1990

[30] Foreign Application Priority Data

Apr. 29, 1989 [DE] Fed. Rep. of Germany ....... 3914294

[51] Int. Cl.[5] ......................... B01J 23/52; B01J 23/76

[52] U.S. Cl. ................................................ 502/330

[58] Field of Search ........................ 502/243, 330, 344

[56] References Cited

U.S. PATENT DOCUMENTS 4,158,643 6/1979 Sinha .................................. 252/447
4,185,082 1/1980 Sinha .................................. 423/437
4,657,888 4/1987 Mesters et al. ...................... 502/331
4,661,468 4/1987 Lee et al. ............................ 502/333
4,698,324 10/1987 Haruta et al. ....................... 502/243
4,839,327 6/1989 Haruta et al. ................... 502/330 X
4,937,219 6/1990 Haruta et al. ................... 502/344 X

FOREIGN PATENT DOCUMENTS 95313 11/1983 European Pat. Off. .
EP147839 7/1985 European Pat. Off. .
3832268 4/1989 Fed. Rep. of Germany .
906299 12/1945 France .
2530160 1/1984 France .
1472062 4/1977 United Kingdom ................ 502/243

OTHER PUBLICATIONS

Chemical Abstracts 105:65657a (abstract of Haruta et al., Japanese Apl. No. JP 60/238,149).
Chemical Abstracts 84:80369z (abstract of Sakai et al. Japanese Apl. No. JP 50/98,487 (1975)).
Chemical Abstracts 94:24540t (abstract of Japanese Patent Apl. 55/94,153 (1980)).
Chemical Abstracts 85:167306w (abstract of Sinha, German Patent Apl. DE 2,610,287).
Haruta, *Chemistry Letters*, pp. 405–408 (1987).

*Primary Examiner*—W. J. Shine
*Attorney, Agent, or Firm*—Foley & Lardner

[57] ABSTRACT

Carrier catalysts for oxidizing carbon monoxide at temperatures below about 50° C. produced by applying a gold compound to a porous ceramic comprising $Fe_2O_3$ and calcining the resulting gold-containing carrier at a temperature of at least 200° C., the process of producing such catalysts, and the use of such catalysts to oxidize carbon monoxide are described.

22 Claims, No Drawings

CARRIER CATALYSTS FOR OXIDIZING CARBON MONOXIDE AND PROCESS FOR THEIR PRODUCTION

BACKGROUND OF THE INVENTION

The present invention relates to a process for producing carrier catalysts containing gold or a mixture of gold and iron oxide for oxidizing carbon monoxide below about 50° C., to carrier catalysts produced according to the process of the invention, and to the use of such catalysts to oxidize carbon monoxide.

Carbon monoxide (CO) is a gas which is used in many industrial processes, for instance in the carbonylation of hydrocarbons to produce aldehydes. Furthermore, it is produced in chemical processes, particularly as a product of incomplete combustion, for instance in furnaces or internal combustion engines. Furthermore, it may be present in the ambient air of industrial plants or in parts of plants in which CO is used in operation, and also in coal mines. Due to the high toxicity of this colorless, odorless gas, it is desirable and, in the case of a correspondingly high concentration of CO, also necessary, to reduce the CO content in the air, in particular the inhaled air, to as great an extent as possible. Catalyzed oxidation, for instance with atmospheric oxygen, is particularly well suited for this purpose. Thus, extensive attempts have been made for a long time to develop catalysts which can be used for oxidizing CO.

For instance, catalysts for oxidizing CO have been developed which develop their catalytic activity only at high temperatures, for instance at or above 300° C., and are therefore particularly well suited for treating hot combustion gases containing CO. In this type of application, the development of the catalytic activity only at such high temperatures is not a disadvantage, since combustion gases generally occur at such high temperatures. Also, there is naturally no possibility of contamination of the catalysts due to condensing water vapor. However, such catalysts cannot be used to oxidize CO at temperatures below 50° C.

For catalysts which are intended to catalyze the oxidation of CO at temperatures below about 50° C., for instance in air (usually containing water vapor) and which for instance are intended to be used in rescue apparatus for miners or the like, it is of decisive importance first that they must be catalytically active in the range of about −10° C. to about 50° C. Advantageously, they should also remain active in the presence of moisture. Other desirable properties are the most economical utilization possible of the catalytically active constituents, for instance noble metals, which are generally very expensive, and also good handling ability.

Catalysts are known which can catalyze the oxidation of CO even at temperatures below 50° C. Hopcalite, a mixture of manganese dioxide, copper oxide, and if desired other metal oxides, for instance cobalt oxide and silver oxide, should be mentioned in particular. However, hopcalite has the decisive disadvantage that it is very rapidly deactivated by water vapor, which is always present in air. To be able to use hopcalite for the oxidation of CO in moist air, for instance in rescue apparatus, it is necessary to combine it with a drying agent, which of course likewise has only a limited capacity for water collection.

Besides hopcalite, which consists entirely or predominantly of catalytically active base metals, the catalytic activity of noble metals with respect to the oxidation of carbon oxide at ambient temperature in moist air has also been investigated.

In a publication in Chemistry Letters 1987, pages 405 to 408, authors M. Haruta, T. Kobayashi, H. Sano and N. Yamada mention catalytically active full catalysts of gold and a transition metal oxide, in particular $\alpha$-$Fe_2O_3$, which can be used for the catalytic oxidation of CO even at ambient temperature in moist air. The preferred catalysts consist of 5 atom-% gold and 95 atom-% iron in the form of $\alpha$-$Fe_2O_3$, that is to say about 11.5% by weight gold and 88.5% by weight $\alpha$-$Fe_2O_3$. In order to be effective, these catalysts not only need to have this special composition, but they must also have been produced in a special way, namely by co-precipitation of the constituents. Carrier catalysts prove ineffective for CO oxidation at temperatures below about 50° C. From this a person skilled in the art has to draw the conclusion that carrier catalysts are not suitable for this purpose.

SUMMARY OF THE INVENTION

It is the object of the invention to provide carrier catalysts which are usable in the oxidation of CO at temperatures below about 50° C.

Another object of the invention is to provide carrier catalysts for oxidizing CO at temperatures below about 50° C. which at least partially overcome the drawbacks of prior art catalysts.

It is also an object of the invention to provide a process for producing a carrier catalyst usable in the oxidation of CO at temperatures below about 50° C.

A further object of the invention is to provide a process for oxidizing CO using a carrier catalyst at a temperature below about 50° C.

These and other objects of the invention are achieved by providing a process for producing a carrier catalyst for oxidizing carbon monoxide (CO) at temperatures below about 50° C., comprising the steps of:

a) applying a gold compound to a porous ceramic carrier material containing $Fe_2O_3$, and b) calcining the carrier material containing said gold compound at a temperature of at least 200° C., wherein said gold compound is applied to the carrier material in such an amount that the gold content is between about 0.01% by weight and about 15% by weight relative to the total weight of the calcined carrier catalyst.

DETAILED DESCRIPTION OF PREFERRED EMBODIMENTS

The process according to the invention for producing carrier catalysts for oxidizing CO at temperatures below about 50° C. is characterized in that a porous ceramic carrier material containing $Fe_2O_3$ a) is impregnated with a solution of a gold compound or is coated with the suspension of a gold compound and is then dried if desired and b) the carrier material containing a gold compound is calcined at a temperature of at least 200° C., with the proviso that the gold is applied to the material in such a quantity that the content of gold, relative to the total weight of the finished carrier catalyst, is between about 0.01% by weight and about 15% by weight, preferably between about 0.05 and 4% by weight, in particular between about 0.1 and 1% by weight.

As used herein, the term "porous" ceramic material refers to a ceramic material which has a specific surface area of about 10 to about 300 $m^2/g$.

Those materials in which $Fe_2O_3$ is present in a mixture with other materials known as ceramic carrier materials, in particular oxides of 3-valent or 4-valent metals, for instance, are used as a porous ceramic carrier material containing $Fe_2O_3$. Among these are, for instance, aluminum oxides, in particular $\gamma$-aluminum oxide, silicon dioxide and aluminosilicates. Carrier materials containing $Fe_2O_3$ and other metal oxides can be readily produced by conventional known processes for the production of such mixed oxide carriers.

One way of producing the carrier materials containing $Fe_2O_3$ consists, for instance, in impregnating a commercially available $Fe_2O_3$-free carrier, for instance $\gamma$-aluminum oxide, $SiO_2$ or aluminosilicate, with a solution of an iron salt, for instance an aqueous solution of iron chloride or preferably iron nitrate, and calcining the carrier at temperatures above 250° C., preferably at temperatures between 300° and about 500° C.

Preferably a carrier-material is used in the present invention which, apart from unavoidable impurities due to production, consists essentially of $Fe_2O_3$.

The form in which the carrier material which contains $Fe_2O_3$ or consists of $Fe_2O_3$ is present is not particularly critical for use within the scope of the present invention. The carrier forms known to persons skilled in the art, for instance beads or cut or broken extrusions, may be used. However, it must be taken into consideration that carrier materials having particle sizes smaller than about 0.5 mm are difficult to handle. Advantageously, particles are used which have a size of between about 0.5 and about 10 mm, preferably between 1 and 7 mm. Monolithic carriers, for instance honeycomb bodies with conventional channel diameters, for instance 0.5 to 5 mm, are also suitable.

In step a) the porous ceramic carrier material which contains $Fe_2O_3$ or consists of $Fe_2O_3$ is impregnated with a solution of a gold compound or is coated with a suspension of a gold compound. It is preferred to impregnate the carrier material with a solution of a gold compound.

Solutions of gold compounds in organic solvents, for instance ethers such as diethyl ether or alcohols such as ethyl alcohol, optionally in a mixture with water, may be used as gold compound solutions. Preferably purely aqueous solutions of gold compounds are used.

Salts which contain gold cations, for instance gold halides, in particular gold trichloride, may for instance be used as a gold compound. Salts comprising complexed gold cations may also be used; examples of suitable complex forming agents include ammonia or primary, secondary or tertiary amines substituted with lower alkyl groups. For example, gold(diethylamine) trichloride may be used.

Gold compounds which contain the gold in the form of complex anions may for instance also be used. Examples of compounds which can be used include the auric acids, hydrated if desired, such as haloauric acids, in particular chloroauric acid, and also cyanoauric acid or nitroauric acid, as well as the corresponding alkali salts, for instance the potassium salts.

In the process of the present invention, chloroauric acid tetrahydrate is preferably used as the gold compound.

The concentration of the gold compound solution, particularly of an aqueous solution, is not critical. It is advantageously from about 10 to about 100 grams per liter of solvent.

In one variant, the carrier material is coated with a suspension of a gold compound. For this purpose very finely ground gold compounds can be suspended, for instance in water. Non-aged, i.e. freshly prepared, suspensions of a gold compound are particularly suitable. Suspensions of basic gold compounds such as gold hydroxide are highly suitable. These suspensions can be produced by producing a solution of a gold compound—the gold compounds and solvents described above are suitable—and contacting the solution with a base. Examples of suitable bases include basic alkali or ammonium compounds, for instance aqueous ammonia, sodium hydroxide solution, or potassium hydroxide solution or sodium, potassium or ammonium carbonates or hydrogen carbonates. Ammonium compounds, in particular ammonium carbonate, are particularly suitable. The base is advantageously used in the form of a solution, in particular in the form of an aqueous solution. The concentration is not critical and is advantageously between 10 g/l and 100 g/l.

In a preferred embodiment of the process according to the invention, the carrier material is additionally impregnated with a solution of an iron compound or is coated with a suspension of an iron compound in step a). Impregnation with a solution of an iron compound is preferred.

Advantageously solutions of iron(III) salts are used as the iron compound solutions. Iron salts with the anions of organic acids, for instance formic acid, may be used, but preferably salts with the anions of inorganic acids are used. Iron halides and iron pseudohalides, in particular iron chloride, are especially suitable. Iron nitrate is outstandingly suitable. Organic solvents, e.g. ethers such as diethyl ether, may be used as solvents. Alcohols, for instance ethyl alcohol, optionally in a mixture with water, may also be used. Water is used as the preferred solvent. The concentration of the iron salt is advantageously between about 10 g and 400 g per liter of solvent.

If the carrier material is coated with a suspension of an iron compound, suspensions of finely pulverized iron compounds can be used. Preferably, non-aged suspensions are used. Suspensions of basic iron(III) compounds, for instance ferric oxide hydrate, ferric hydroxide, are highly suitable. These suspensions may be obtained by contacting iron salt solutions, for instance iron nitrate, with bases, in particular the above-described bases such as ammonium carbonate.

The solutions of the gold compound and iron compound or the corresponding suspensions may be applied to the carrier material in succession, preferably in the sequence iron compound-gold compound, or simultaneously. It is also possible to apply one of the two metal compounds as a solution and the other as a suspension.

Advantageously, the two components are applied to the carrier at the same time. For this purpose, the carrier material may for example be coated with a suspension of a gold compound and an iron compound obtained by coprecipitation. It is particularly preferred in the process of the invention to apply a mixture of a gold compound with an iron compound to the carrier material by impregnating the carrier material with a solution which contains both an iron compound and a gold compound.

The above described salt solutions or suspensions may be applied to the carrier material according to methods which are conventionally used to produce carrier catalysts. For instance, the carrier material may be dipped into the salt solution or suspension in order to impregnate or coat it. Preferably the carrier material is sprayed with the salt solutions or suspensions.

If desired, the carrier material containing a gold compound which was formed in step a) may be dried, for instance at temperatures of between 50° and 150° C.

The above described application of gold compounds or gold and iron compounds in the form of solutions or suspensions may be repeated, optionally after drying, in order to ensure that the gold is contained in the finished carrier catalyst in a quantity of about 0.01 to about 15% by weight, preferably of 0.05 to 4% by weight. A person skilled in the art can easily determine whether and, if necessary, how many times the application needs to be repeated by analysis of the finished carrier catalyst.

After impregnation or coating with the salt solution(s) or suspension(s), the carrier material may be contacted with a base, if desired after drying as described above. Examples of suitable bases include aqueous ammonia, alkali lyes, alkali or ammonium bicarbonate and alkali or ammonium carbonate. They are preferably present in the form of a aqueous solution. An aqueous solution of ammonium carbonate having a concentration of 10 to 300 grams per liter is particularly suitable.

It has been discovered that when carrier material is present which has been impregnated with a gold compound, or which has been impregnated according to a preferred embodiment with a gold compound and with an iron compound, the contacting of the impregnated carrier material with a base yields particularly advantageous results.

A very particularly preferred embodiment of the process according to the invention envisions use of a carrier material consisting of $Fe_2O_3$, application of a mixture of a gold compound and an iron compound to the carrier material by impregnating the carrier material with a solution containing a gold compound and an iron compound, drying the impregnated carrier material, contacting the dried carrier with a base, and calcining the base treated carrier at a temperature of at least 200° C.

Excellent carrier catalysts are obtained if gold and iron compounds are applied to the carrier in quantities which correspond to an atomic ratio of gold to iron of about 1:999 to 1:4, preferably from 1:99 to 1:9.

The temperature at which the precipitation of the suspension or the subsequent treatment of the impregnated preliminary carrier catalyst stage is carried out is between 0° C. and about 90° C., preferably between 20° C. and 80° C., and particularly preferably between 20° C. and 60° C.

The carrier material containing gold compounds, which is obtainable according to one of the above described processes, is dried if desired and then is calcined at temperatures of at least 200° C. in order to convert it into a carrier catalyst according to the invention. This may take place in an atmosphere of inert gases such as nitrogen. Advantageously, the calcination takes place in air. The calcination takes place over a period of up to several hours, for instance over a period of 1 to 24 hours. The carrier material containing gold compounds, or gold compounds and iron compounds, first is activated by this calcination and then is usable for CO oxidation at temperatures below about 50° C. The calcination temperature is preferably between about 300° C. and about 500° C.

Another object of the invention is to provide carrier catalysts obtainable according to the process of the invention.

The carrier catalysts according to the invention, which are usable for oxidizing CO at temperatures below about 50° C., are characterized in that they contain gold or a mixture of gold and iron oxide, applied to a porous, ceramic carrier material containing $Fe_2O_3$ and activated by calcining at temperatures of at least 200° C., wherein the gold content, relative to the total weight of the carrier catalyst, is between about 0.01 and about 15% by weight, preferably between about 0.05 and about 4% by weight, particularly preferably between about 0.1 and about 1% by weight.

Preferred carrier catalysts within the scope of the present invention are those in which the carrier material—apart from unavoidable impurities due to production—consists essentially of $Fe_2O_3$.

Carrier catalysts to which a mixture of gold with iron oxide has been applied are preferred.

Within the scope of the present invention, carrier catalysts in which the atomic ratio of gold to iron in the applied mixture of gold and iron oxide is between about 1:999 to 1:4, preferably between about 1:99 to 1:9, are particularly preferred.

The carrier catalysts according to the invention are present in activated form. This activation is caused by calcination at temperatures of at least 200° C., preferably by calcination at temperatures of between 300° C. and 500° C.

Surprisingly, the carrier catalysts according to the invention have proved useful for oxidizing CO at temperatures below about 50° C. They are catalytically active even in the presence of moisture (water vapor). The CO may be contained in gas mixtures in a relatively low concentration, for instance in a concentration of about 5 ppm to about 100 ppm, but also in higher concentrations, up to 10% by volume and more. The carrier catalysts according to the invention are therefore particularly well suited for oxidizing CO in air which may optionally contain moisture at temperatures below about 50° C. Their field of application may be found for instance in air-conditioning, especially for driver's cabs and passenger compartments of busses or automobiles, and in so-called individual rescue equipment, as used, for example, in mines and by fire department rescue services.

Another object of the invention is to provide a process for oxidizing CO at temperatures below about 50° C., in which a gas containing CO and oxygen is passed through a carrier catalyst obtainable according to one of the above described production processes.

The CO content may be between 5 ppm and 10% by volume. The oxygen content should advantageously correspond at least to the quantity required for complete oxidation.

A process in which CO-containing air is passed through a carrier catalyst obtainable according to one of the above described production processes is preferred. The air may be dry air.

Advantageously, in the process according to the invention for oxidizing CO, water-containing air is passed through the catalyst. The air may contain water vapor in small quantities up to the saturation point, for instance between about 0.1% and 80% relative moisture content.

Advantages of the carrier catalysts according to the invention, which surprisingly are effective at low temperatures even in the presence of moisture, are that they are easy to handle, their particularly economical utilization of the noble metal which is used, i.e. gold, and also their simple method of production.

The following examples are intended to illustrate the invention in further detail without restricting its scope.

EXAMPLE 1

Preparation of a carrier catalyst containing a mixture of gold and iron oxide using an $Fe_2O_3$-containing carrier material

EXAMPLE 1.1

Preparation of the carrier material

To produce an $Fe_2O_3$-containing porous ceramic carrier material, a $\gamma$-$Al_2O_3$ carrier in the form of extruded bodies, having a diameter of 2 mm and a specific surface area of 120 $m^2/g$, was used which was obtained by extruding $\gamma$-$Al_2O_3$ powder, mixed with water, drying and breaking the extrudate. The broken extruded bodies had lengths of about 2 to 6 mm.

Approximately 38.5 g of this carrier material were dipped into an aqueous solution, which was prepared using distilled water and which contained iron nitrate in a concentration of 50 g/l. The carrier material was left in this aqueous solution for about 2 hours. The impregnated material was then sieved out of the solution, dried at 120° C. and calcined for 2 hours at 400° C. 40 g of an $Fe_2O_3$-containing $\gamma$-$Al_2O_3$ carrier were obtained.

EXAMPLE 1.2

Preparation of the carrier catalyst (without subsequent treatment with a base)

Approximately 40 g of the $Fe_2O_3$-containing carrier material produced in Example 1.1 were impregnated with an aqueous solution which contained 30 g/l chloroauric acid tetrahydrate and approximately 390 g/l iron nitrate nonahydrate. The carrier material was then dried at 120° C. It contained a mixture of gold salt and iron salt applied to the carrier material.

The resulting impregnated carrier material was activated by calcining for 5 hours at 400° C. in an air atmosphere by calcining. The finished carrier catalyst obtained in this manner contained 0.25% by weight gold.

EXAMPLE 2

Preparation of a carrier catalyst containing gold and iron oxide using $Fe_2O_3$-containing, porous ceramic carrier material and subsequent treatment with a base b 40 g of a carrier material produced according to Example 1.1 were impregnated with an aqueous solution which contained 30 g/l chloroauric acid tetrahydrate and 390 g/l iron nitrate nonahydrate. The carrier material was then dried at 120° C. Then the material was placed into an aqueous solution of ammonium carbonate (concentration: 290 g/l) and sieved out after 5 minutes and dried.

The resulting impregnated and subsequently treated carrier material was activated by calcining for 5 hours at 400° C. in an air atmosphere. The gold content of the carrier catalyst obtained in this manner was about 0.25% by weight.

EXAMPLE 3

Preparation of a carrier catalyst containing gold and iron oxide using porous ceramic material consisting of $Fe_2O_3$ (hematite)

45 g of a carrier material consisting of hematite ($\alpha$-$Fe_2O_3$) in grit form, particle diameter: 0.5 to 3 mm (commercially available from Giulini, Ludwigshafen, Germany) were impregnated with an aqueous solution which contained 30 g/l chloroauric acid tetrahydrate and 390 g/l iron nitrate nonahydrate. The impregnated carrier was dried at 120° C. and dipped into an aqueous solution of ammonium carbonate (concentration about 290 g/l). After 5 minutes the material was sieved out of the solution, dried at 120° C. and activated by calcining for 5 hours at 400° C. in an air atmosphere. The gold content of the resulting carrier catalyst was approximately 0.22% by weight.

EXAMPLE 4

Use of the carrier catalysts produced in Examples 1 to 3 for CO oxidation

EXAMPLE 4.1

A tubular reactor having an internal diameter of approximately 2 cm was used as the reactor. 10 g of the carrier catalyst obtained according to Example 1 were introduced into this reactor. Air having a relative air humidity of 90% and a CO content of approximately 50° C. ppm was passed through the catalyst bed obtained in this manner. The temperature of the catalyst bed, tubular reactor and gas was ambient temperature, i.e. 22° C. The air to be cleaned was passed through the catalyst at a volumetric flow rate of 5 liters per hour. After passing the catalyst bed, the residual concentration of CO in the air was only about 19 ppm, i.e. only 38% of the initial value.

EXAMPLE 4.2

10 g of the carrier catalyst produced in Example 2 were used in the above described tubular reactor. This experiment was otherwise carried out under the same conditions as in Example 4.1. This time a decrease of the CO concentration to approximately 50% of the original value was observed.

EXAMPLE 4.3:

This time, 12 g of the carrier catalyst produced in Example 3 were used. This test was carried out under the same conditions as in Example 4.1. After passing through the catalyst bed, the CO content of the air had been decreased to only about 30% of the initial value.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A process for producing a carrier catalyst for oxidizing carbon monoxide (CO) at temperatures below about 50° C., comprising the steps of:

a) providing a porous ceramic carrier material containing $Fe_2O_3$;

b) impregnating said carrier material with a solution of a gold compound and a solution of an iron compound; and c) calcining the impregnated carrier material containing said gold compound and iron compound at a temperature of at least 200° C., wherein said gold compound is applied to the carrier material in such an amount that the gold content is between about 0.01% by weight and about 15% by weight relative to the total weight of the calcined carrier catalyst.

2. A process according to claim 1, further comprising the step of drying said carrier material after application of the gold compound and prior to said calcining step.

3. A process according to claim 1, wherein said gold compound is applied to said carrier in such an amount that the gold content is between about 0.05 and about 4% by weight relative to the total weight of the finished carrier catalyst.

4. A process according to claim 3, wherein said gold compound is applied to said carrier in such an amount that the gold content is between about 0.1 and about 1% by weight relative to the total weight of the finished carrier catalyst.

5. A process according to claim 1, wherein a porous material which consists essentially of $Fe_2O_3$ is used as a carrier.

6. A process according to claim 1, wherein said carrier material is impregnated with a solution containing both a gold compound and an iron compound.

7. A process according to claim 1, wherein said gold compound is an inorganic gold salt.

8. A process according to claim 7, wherein said gold compound is a gold halide.

9. A process according to claim 8, wherein said gold compound is gold trichloride.

10. A process according to claim 1, wherein said gold compound contains gold in the form of a complex anion.

11. A process according to claim 10, wherein said gold compound is selected from the group of haloauric acid and alkali metal salts of haloauric acid.

12. A process according to claim 11, wherein said gold compound is chloroauric acid tetrahydrate.

13. A process according to claim 1, wherein said iron compound is an inorganic iron salt.

14. A process according to claim 13, wherein said inorganic iron salt is iron nitrate.

15. A process according to claim 1, further comprising in step a) contacting said catalyst material with a base after application of said gold compound.

16. A process according to claim 15, wherein said base is selected from the group consisting of basic alkali and ammonium compounds.

17. A process according to claim 16, wherein said base is ammonium carbonate.

18. A process according to claim 15, wherein said contacting with a base is carried out at temperatures in the range from about 20° C. to about 80° C.

19. A process according to claim 1, wherein quantities of gold and iron compounds are used which correspond to an atomic ratio of gold to iron of 1:999 to 1:4.

20. A process according to claim 19, wherein quantities of gold and iron compounds are used which correspond to an atomic ratio of gold to iron of 1:99 to 1:9.

21. A process according to claim 1, wherein said calcination is carried out at a temperature in the range from about 200° C. to about 500° C.

22. A carrier catalyst produced by a) providing a porous ceramic carrier material containing $Fe_2O_3$;

b) impregnating said carrier material with a solution of a gold compound and a solution of an iron compound; and c) calcining the impregnated carrier material containing said gold compound and iron compound at a temperature of at least 200° C., wherein said gold compound is applied to the carrier material in such an amount that the gold content is between about 0.01% by weight and about 25% by weight relative to the total weight of the calcined carrier catalyst.

* * * * *